United States Patent [19]

Iwanaga

[11] Patent Number: 4,601,219

[45] Date of Patent: Jul. 22, 1986

[54] LUBRICATION ARRANGEMENT FOR FINAL GEAR UNIT OF AUTOMOTIVE TRANSAXLE

[75] Inventor: Kazuyoshi Iwanaga, Atsugi, Japan

[73] Assignee: Nissan Motor Co., Ltd., Yokohama, Japan

[21] Appl. No.: 595,396

[22] Filed: Mar. 30, 1984

[30] Foreign Application Priority Data

Jul. 8, 1983 [JP] Japan ................................ 58-123441

[51] Int. Cl.⁴ ............................................. B60K 41/00
[52] U.S. Cl. ........................................ 74/867; 74/868
[58] Field of Search ......................... 74/867, 868, 869

[56] References Cited

U.S. PATENT DOCUMENTS

| | | | |
|---|---|---|---|
| 3,274,848 | 9/1966 | Konrad et al. | 74/869 X |
| 3,327,554 | 6/1967 | Searles | 74/869 |
| 3,546,973 | 12/1970 | Ohie et al. | 74/868 |
| 3,561,294 | 2/1971 | Iijima et al. | 74/869 |
| 3,667,323 | 6/1972 | Irie | 74/869 X |
| 4,005,620 | 2/1977 | Dach et al. | 74/869 X |
| 4,325,271 | 4/1982 | Iwanaga et al. | 74/869 |
| 4,347,764 | 9/1982 | Lauven | 74/867 |
| 4,446,759 | 5/1984 | McCrary | 74/867 |
| 4,466,312 | 8/1984 | Oguma | 74/867 X |
| 4,488,457 | 12/1984 | Nishimura et al. | 74/869 X |

FOREIGN PATENT DOCUMENTS

| | | | |
|---|---|---|---|
| 36668 | 9/1981 | European Pat. Off. | 74/869 |
| 36613 | 3/1980 | Japan | 74/868 |

Primary Examiner—Lawrence J. Staab
Assistant Examiner—Dwight G. Diehl
Attorney, Agent, or Firm—Schwartz, Jeffery, Schwaab, Mack, Blumenthal & Evans

[57] ABSTRACT

In order to securely lubricate a final drive unit of a transaxle including a torque converter and a hydraulically controlled transmission, the line pressure regulator valve of the hydraulic control system is arranged to discharge surplus hydraulic fluid via first and second drain ports into a conduit arrangement which fluidly communicates with both of the torque converter and the final drive unit. The conduit arrangement is arranged to relieve any excess fluid fed thereto from the first drain port toward the final drive unit in addition to that fed thereto from said second drain port.

2 Claims, 1 Drawing Figure

LUBRICATION ARRANGEMENT FOR FINAL GEAR UNIT OF AUTOMOTIVE TRANSAXLE

BACKGROUND OF THE PRESENT INVENTION

1. Field of the Invention

The present invention relates generally to automotive transaxles and more specifically to an improved lubrication arrangement for the final gear thereof.

2. Description of the Prior Art

In a previously proposed transaxle arrangement, namely the "RN3F01A" type automatic transaxle manufactured by the NISSAN MOTOR CO., LTD, an oil gutter has been provided which collects oil splashed up by the transmission gear train and directs same into the differential gear of the final drive unit. However, this arrangement has suffered from the drawback that it is difficult to ensure that an adequate supply of oil is fed to the final drive unit under all operating conditions of the vehicle. That is to say, under given inclinations and/or vibrations of the vehicle the lubricating oil is apt not to flow as intended into the differential gear housing.

One possible method of overcoming this problem is to inject some of the fluid used to operate the servo units of the transmission (viz., hydraulic fluid at line pressure) into the final gear unit. However, this arrangement requires the transmission to be equipped with a pump having an increased discharge capacity and results in a larger, bulkier arrangement which consumes otherwise usable amounts of engine output.

SUMMARY OF THE INVENTION

It is an object of the present invention to provide a lubrication arrangement for a transaxle which insures the required amount of lubricant (hydraulic fluid) is fed to the final drive unit under all modes of engine and vehicle operation and which does not require the oil pump of the transmission to have an increased discharge capacity for this purpose.

In brief, the above object is fullfilled via an arrangement wherein, in order to securely lubricate a final drive unit of a transaxle including a torque converter and a hydraulically controlled transmission, the line pressure regulator valve of the hydraulic control system is arranged to discharge surplus hydraulic fluid via first and second drain ports into a conduit arrangement which fluidly communicates with both of the torque converter and the final drive unit. The conduit arrangement is arranged to relieve any excess fluid fed thereto from the first drain port toward the final drive unit in addition to that fed thereto from said second drain port.

More specifically, the present invention takes the form of a transaxle including a torque converter and a final drive unit integrated with a transmission gear train, a hydraulic control system for controlling the operation of the transmission and which includes, a pump for discharging hydraulic fluid under pressure, and a pressure regulator valve for controlling the pressure of hydraulic fluid fed to the control system by controllably draining off some of the fluid discharged from the pump, and a conduit arrangement for feeding the surplus hydraulic fluid discharged from the pressure regulator valve to both the torque converter and the final gear.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
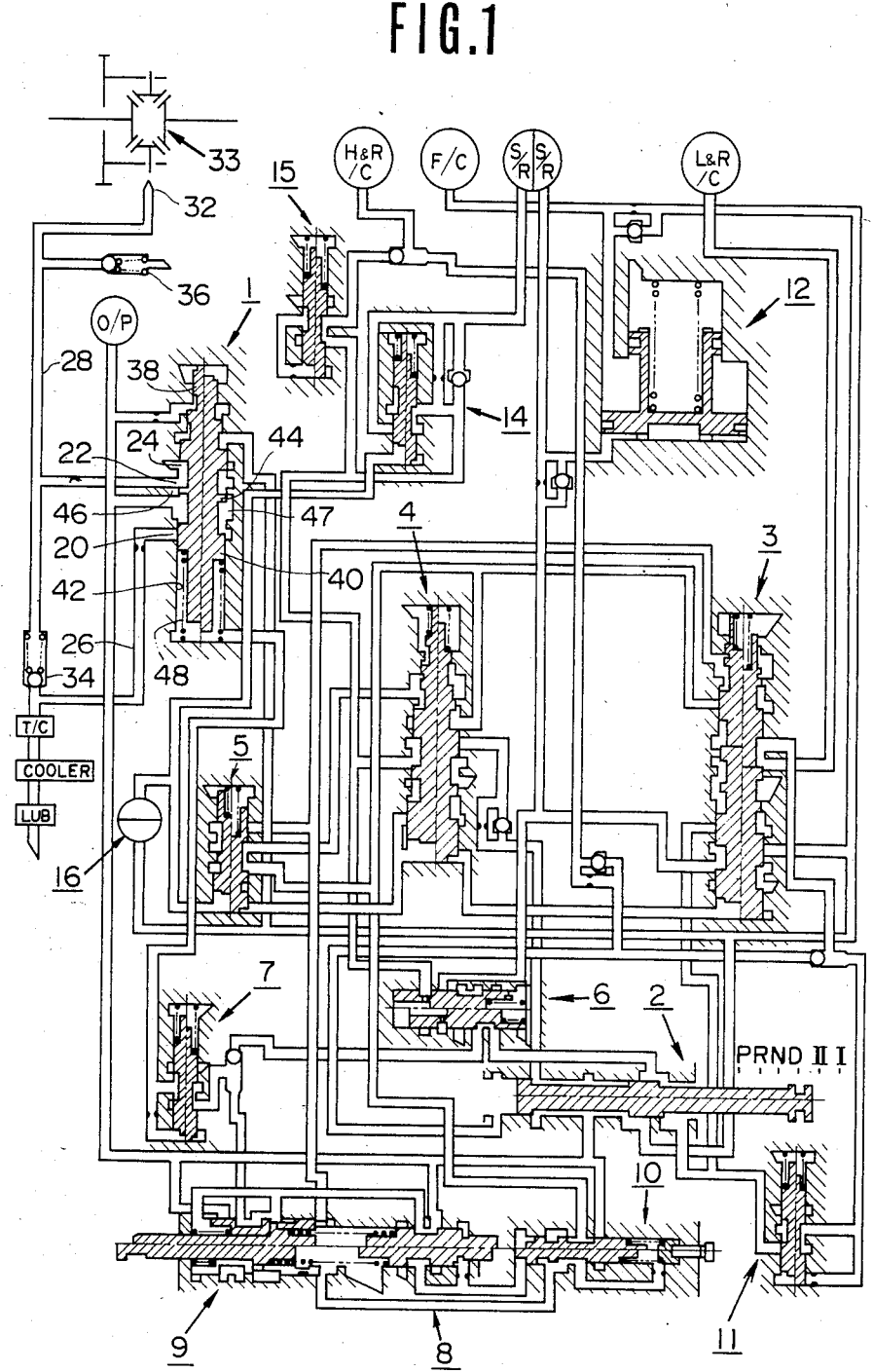
FIG. 1 is a schematic diagram of an automatic transmission control system in which an embodiment of the present invention is incorporated.

FIG. 1 shows an example of a hydraulic control circuit via which a planetary gear train of an automotive transaxle is controlled. This arrangement as shown, includes an oil pump O/P, a regulator valve 1, a manual selector valve 2, a 1-2 shift valve 3, a 2-3 shift valve 4, a 3-2 downshift valve 5, a line pressure booster valve 6, a pressure modifying valve 7, a throttle valve 8, a throttle failsafe valve 9, a throttle modulator valve 10, a first gear range pressure reducing valve 11, an accumulator 12, a 3-2 timing valve 14, a high and reverse pressure reduction valve 15, and a governor valve 16. The construction and operation of this arrangement with the exception of the construction of the pressure regulator valve is essentially the same as that disclosed in European Patent Application No. 0 059 425 published on Sept. 8, 1982 the disclosure of which is incorporated herein by reference.

In the embodiment of the present invention the pressure regulator valve 1 is arranged to have three drain ports 20, 22, and 24. Drain port 20 communicates with a conduit 26 and feeds the hydraulic fluid discharged therethrough to a torque converter T/C. Subsequent to passing through the torque converter T/C the hydraulic fluid from port 20 is cooled in a cooler and fed to the gear train of the transmission for lubricating same. Drain port 22 communicates with a conduit 28 which leads to the final drive unit 33. This conduit (28) terminates in a nozzle 32 which directs the hydraulic fluid passing therethrough against the various elements of the differential gear forming the major part of the final drive unit 33. A relief valve 34 provides a one-way flow connection between conduits 26 and 28 and is arranged to, upon a predetermined pressure prevailing in conduit 26, vent excess hydraulic fluid into conduit 28. Located upstream of the nozzle 32 is a second relief valve 36. This valve 36 functions to, upon a predetermined pressure prevailing in conduit 28, discharge excess hydraulic fluid to the sump (not shown) of the transmission.

With this arrangement, when the line pressure is higher than the instantaneous required level (viz., that required for a given set of operational conditions), the spool 38 of the regulator valve 1 tends to ascend and assume the position shown in the left-hand half section thereof. In this position the relatively broad land 40 juxtaposes the drain port 20 so that the amount of hydraulic fluid which passes between it and the wall of the spool bore 42 is restricted. Due to the narrow nature of land 44, the sealing effect provided thereby is not particularly high. Accordingly, under these conditions a relatively large amount of hydraulic fluid is forced to pass between the relatively narrow land 44 and the rib-like section 46 of the spool bore 42, from chamber 47 to drain port 22. Under these conditions, as the amount of hydraulic fluid being discharged by the pump O/P is quite high, a substantial amount of the surplus hydraulic fluid being drained off by the regulator valve flows out through drain port 22 to the final drive unit 33 via conduit 28. Conversely, when the line pressure is below the required level, the spool tends to move downwardly, against the bias of spring 48 toward the position illustrated by the right hand half section thereof. Under these conditions, the relatively broad land 40 is moved to a level lower than that of drain port 20 and thus permits an increased amount of hydraulic fluid to flow unrestrictedly out via port 20 and conduit 26 toward the torque converter T/C and cooler. Simultaneously, land 44 still tends to maintain a degree of flow restriction between chamber 47 and drain port 22 whereby, due to the relatively unrestricted communication between chamber 47 and port 20, the amount of hydraulic fluid being introduced into conduit 28 via port 22 is reduced as compared with the former situation. However, under such conditions, the relief valve 34, upon an excess of hydraulic fluid being fed to the torque converter T/C opens and relieves the excess hydraulic fluid into conduit 28, thereby compensating for the reduced amount being supplied via port 22 at this time.

Accordingly, conduit 28 is supplied with an adequate amount of hydraulic fluid under all operating conditions of the control system, thus ensuring that the differential gear of the final drive unit 33 is adequately lubricated.

What is claimed is:
1. In a transmission including a torque converter and a final drive unit integrated with a transmission gear train,
    (a) a hydraulic control system for controlling the operation of said transmission and which includes
        (i) a pump for discharging hydraulic fluid under pressure, and
        (ii) a pressure regulator valve for controlling the pressure of hydraulic fluid fed to said control system by controllably draining some of the fluid discharged from said pump; and
    (b) a conduit arrangement for feeding the surplus hydraulic fluid discharged from said pressure regulator valve to both a torque converter and a final gear;
    wherein said pressure regulator valve includes first and second drain ports and wherein said pressure regulator includes:
    a first conduit leading from said first drain port to said torque converter;
    a second conduit leading from said second drain port to said final drive unit;
    a first relief valve in said first conduit for relieving excess hydraulic fluid into said second conduit; and
    a second relief valve for relieving excess fluid in said second conduit to a sump of said transmission,
    said pressure regulator valve being arranged so that when the amount of hydraulic fluid drained off via said port increases the amount drained via said second port decreases and vice versa.
2. A transmission as claimed in claim 1, wherein said pressure regulator valve is arranged to discharge a relatively large amount of hydraulic fluid through said first drain port when the line pressure by said regulator valve to said control system is below an instantaneously required level and for discharging a relatively large amount of hydraulic fluid through said second port when the line pressure discharged by said regulator valve is higher than the instantaneously required level.

* * * * *